United States Patent [19]

Chin et al.

[11] 3,982,635
[45] Sept. 28, 1976

[54] FEEDING AND DISCHARGING APPARATUS FOR BLOW MOLDING OPERATION

[75] Inventors: Charles L. D. Chin, Avon; William R. Wiggins, Forestville; Jon D. Yonko, Vernon, all of Conn.

[73] Assignee: Monsanto Company, St. Louis, Mo.

[22] Filed: Jan. 27, 1975

[21] Appl. No.: 544,052

[52] U.S. Cl. .............................. 214/1 BB; 221/268; 425/387 B; 425/397
[51] Int. Cl.² .................... B65B 39/00; B29D 23/03
[58] Field of Search .......... 425/DIG. 232, DIG. 212, 425/DIG. 213, 126, 387 B, 326 B, 324 B, 397; 221/264, 268; 214/1 BB

[56] References Cited
UNITED STATES PATENTS

| | | | |
|---|---|---|---|
| 2,297,847 | 10/1942 | Wilckens et al. | 221/268 |
| 2,866,561 | 12/1958 | Groves | 221/264 |
| 3,058,150 | 10/1962 | Makowski | 425/126 |
| 3,408,689 | 11/1968 | Heiner | 214/1 BB |
| 3,778,213 | 12/1973 | Di Settembrini | 425/326 B |
| 3,820,932 | 6/1974 | Worthington | 425/DIG. 213 |

FOREIGN PATENTS OR APPLICATIONS

| | | | |
|---|---|---|---|
| 200,710 | 2/1956 | Australia | 425/DIG. 232 |

Primary Examiner—Francis S. Husar
Assistant Examiner—Carl Rowold
Attorney, Agent, or Firm—Eugene Zagarella, Jr.

[57] ABSTRACT

Apparatus for feeding workpieces to and discharging formed articles from a blow mold station generally comprising base means reciprocally movable above a blow mold having one or more pairs of feed and discharge openings and including stop means for temporarily obstructing passage of a workpiece through said feed opening, means for limiting the movement of said stop means and further resilient means associated with said base means to allow continued movement of the portion of the base means containing said opening after said stop means has stopped so as to remove the obstruction at said feed opening provided by said stop means and thereby allow the workpiece to continue through the opening into the blow mold.

14 Claims, 3 Drawing Figures

FEEDING AND DISCHARGING APPARATUS FOR BLOW MOLDING OPERATION

BACKGROUND OF THE INVENTION

This invention relates to apparatus for feeding workpieces to and discharging formed articles from a blow molding station.

While the blow molding art goes back over 200 years, it has only been in the last 15 years or so that blow molding of hollow plastic articles has achieved significant commercial success. Recently, techniques have been developed for forming biaxially oriented hollow articles utilizing a method wherein a workpiece such as a preform (i.e. a tubular body of thermoplastic material) is fabricated into an article while at orientation temperature. One such method, is to take the preform as soon as it is formed by the extrusion apparatus and while it is still hot, and transfer it directly to the blow molding apparatus where it is stretched and molded into the desired shape. Another method involves the reheating and blow molding of cold preforms as disclosed for example in Wiley et al., U.S. Pat. No. 3,507,005. Such method has the advantage of separating the formation of the preform from the article forming operation and gives added flexibility to the overall process since the finished product can be prepared at a later time and can even be carried out by others who desire to purchase the preforms and fabricate the finished product at their own facilities. Inherent in such a reheating technique is the necessity for transferring preforms from a heating means to a molding station. In either method, the transfer of the preform to the blow mold can easily be accomplished by hand or mechanical means as shown for example in Harris, U.S. Pat. No. 3,721,514 or Moore, U.S. Pat. No. 3,765,813. Oftentimes, however, the resulting time cycle does not lead to the high production rates desired in a successful commercial operation and one significant limiting factor is the time taken to feed and discharge the preforms into and out of the blow molding station.

SUMMARY OF THE INVENTION

Now, there has been developed as apparatus capable of feeding workpieces to and discharging formed articles from a blow molding station at high rates of speed.

Accordingly, a principal object of this invention is to provide feeding and discharging apparatus for a blow mold station.

Another object of this invention is to provide apparatus used in the formation of articles such as bottles from reheated preforms at high production rates.

Another object of this invention is to provide reciprocally movable feeding and discharge apparatus located above a blow mold station containing a fixed position stretch rod to allow rapid feeding of workpieces and discharging of formed articles.

Another object of this invention is to provide conveyor means associated with the feeding and discharging apparatus to allow for removal of workpieces if the blow mold is not capable of accepting further workpieces.

Other objects of this invention will in part be obvious and will in part appear hereinafter.

These and other objects are accomplished by providing an apparatus for feeding workpieces to and discharging articles from a blow mold station generally comprising a base means reciprocally disposed above a blow mold having at least one pair of adjacent feed and discharge openings and including stop means for temporarily obstructing passage of a workpiece through said feed opening, means for reciprocating the base means laterally with respect to said mold, means for delimiting reciprocating movement of said stop means and resilient or spring like means associated with the base means to allow the portion thereof containing said opening to continue movement for a sufficient distance after the stop means has stopped to remove the obstruction of the feed opening provided by the stop means and thereby allow the workpiece to continue through the opening into the awaiting blow mold.

In another embodiment of this invention, conveyor means are provided in association with the base means for removing workpieces which arrive at the loading area when the feed and discharge apparatus has not returned to its original position and therefor is not ready to accept additional workpieces.

BRIEF DESCRIPTION OF THE DRAWINGS

In describing the overall invention reference will be made to the accompanying drawings wherein.

DETAILED DESCRIPTION OF THE ILLUSTRATED EMBODIMENTS

Figure 2:
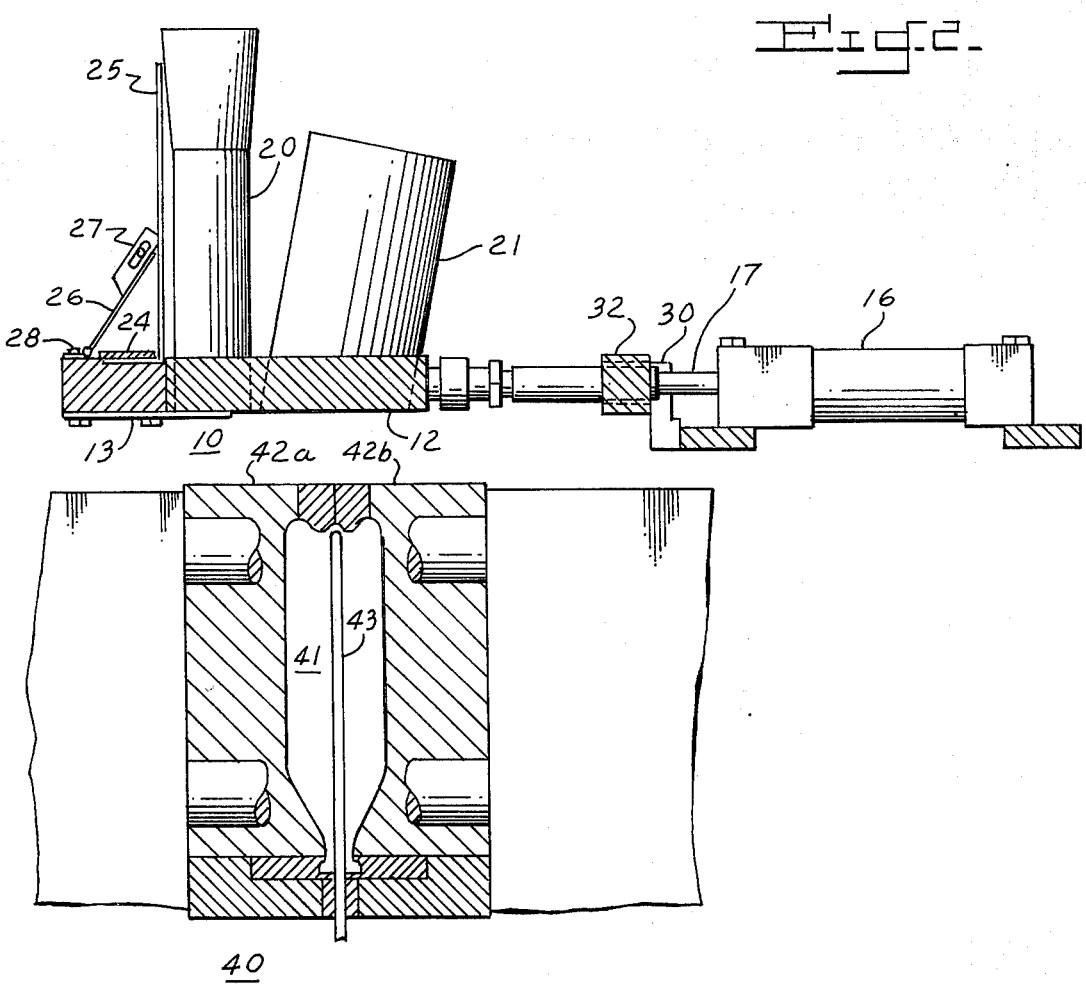
FIG. 2 is an elevational view taken along the line 2—2 of FIG. 1 and shows a blow mold station positioned below the feeding and discharge apparatus.

Referring now to the drawings, there is illustrated in FIG. 2 a blow mold station 40 for preparing shaped blow articles such as bottles. Mold 40 is used in conjunction with a preferred embodiment of this invention which comprises feeding and discharge apparatus shown generally as 10. The blow mold station comprises mold halves 42a and 42b which form a cavity 41 when in the closed position. Stretch rod member 43 is used to longitudinaly stretch a workpiece such as a preform and said rod also may have openings or orifices (not illustrated) for blowing air into the cavity thereby expanding the preform into the desired shape.

Figure 1:
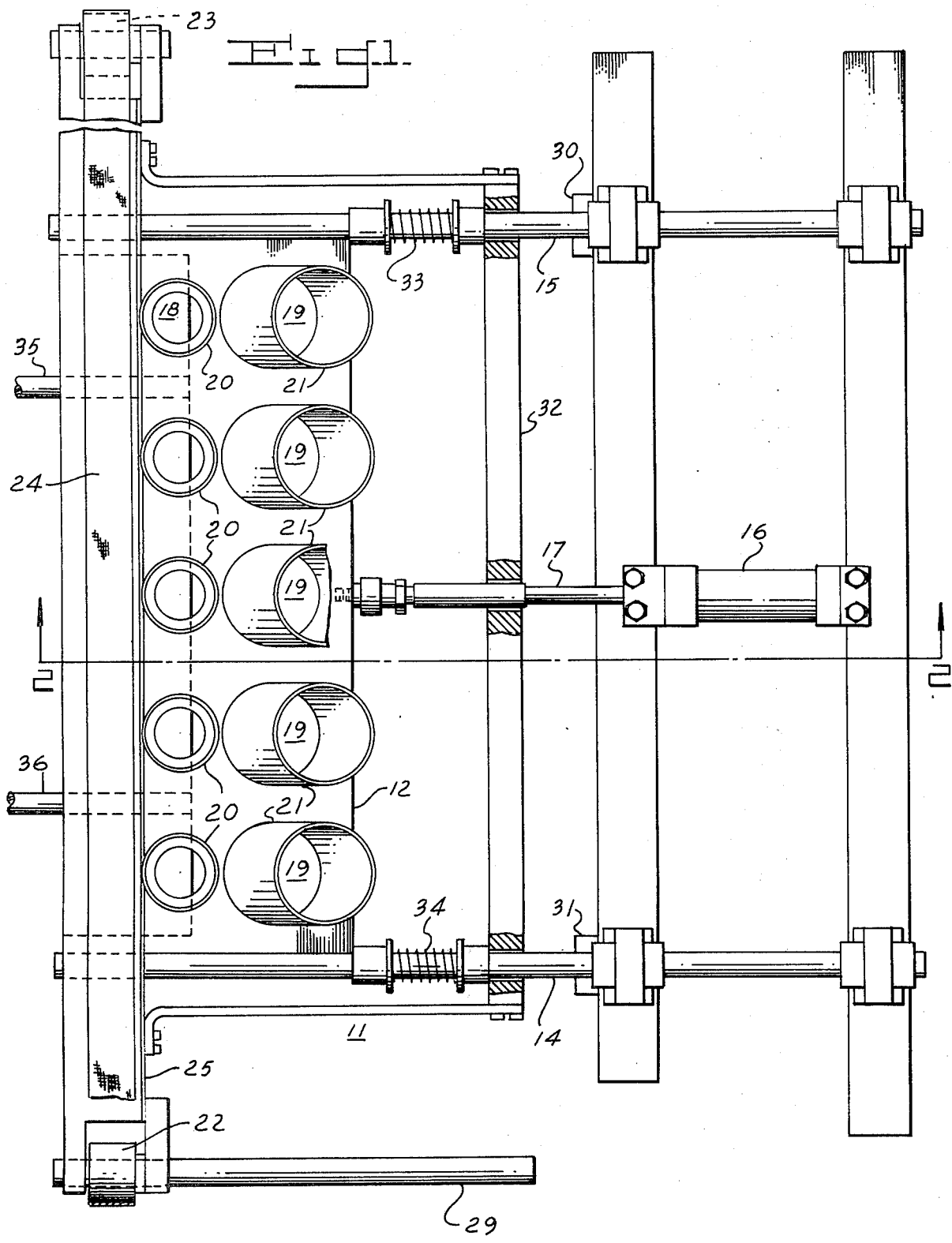
FIG. 1 is a plan view of the apparatus assembly embodying the present invention.

The important feature of the invention is the feeding and discharge apparatus 10 which is shown in detail in both FIGS. 1 and 2. The apparatus comprises base means which includes a main body 12 shown as a plate-like member and is adapted to reciprocally move laterally back and forth in a horizontal direction above the blow mold station. The base means includes supporting frame means designated generally as 11 and guide means 14 and 15 shown as rods which both move in combination with the main body above the blow mold station. The frame 11 is supported on one side by guide rod means 35 and 36 and on the other side by guide rods 14 and 15 which in turn are supported by the frame structure of the actuating device 16 as shown in FIG. 1. The guide rods 35 and 36 as well as the frame structure for the actuating device are supported in a conventional manner not shown to other pieces of equipment or to a permanent structure such as the floor or wall.

The main body 12 of the base means has two adjacent feed and discharge openings therein, 18 for receiving workpieces to be fed to the blow mold station and 19 for passing on or guiding discharged articles after they have been formed in the mold station and ejected therefrom. The base means includes stop means in the form of a drop plate 13 which is provided to act in combination with feed opening 18 and obstruct or retain incoming workpieces until ready to be fed to the blow mold. The drop plate is affixed to the frame means 11 and is positioned below and adjacent to said main body in a manner to block at least a portion of the opening 18 thereby retaining the incoming workpiece in the ready position for feeding the blow mold.

Figure 3:
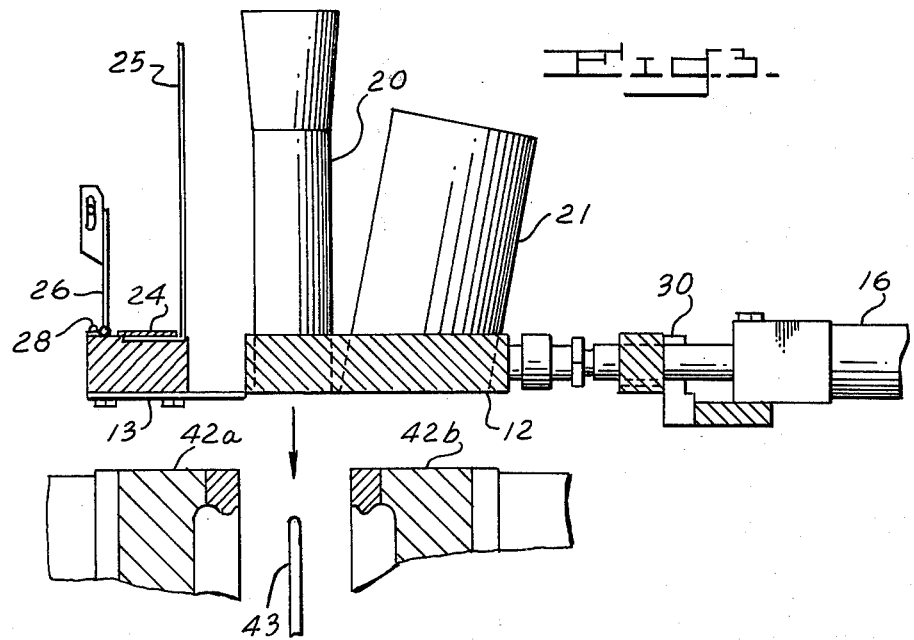
FIG. 3 is a view similar to FIG. 2 showing the feeding and discharge apparatus in position to unload a workpiece into the blow mold station located below.

Feeding of the workpiece to the blow mold is provided by movement of the base means in combination with the frame 11 and guide means (14 and 15) in a direction which places the opening 18 centered above the blow mold station, see FIG. 3. The drop plate which is affixed to the frame means is cleared of the opening when movement of said frame (and the attached drop plate) is stopped after traveling a fixed distance whereas the main body of said base means continues to move to the right as viewed in FIGS. 1–3. This is accomplished when a portion of the frame, bar member 32, abuts into stop plates or members 30 and 31 thereby ceasing movement of the frame 11 and the drop plate 13, however, the main body 12 of the base means continues to move along with said guide rods (14 and 15) for a short distance through resilient means shown as compression springs 33 and 34 which are positioned on said guide rods. This short additional movement of the main body allows it to separate from the drop plate 13 so as to clear opening 18 above the blow mold and thereby feed a workpiece by gravity into the open mold onto stretch rod 43 as illustrated in FIG. 3.

The reciprocating movement of the base means, frame and guide rods then carries the apparatus back to its original position whereby the receiving means i.e. opening 18 plus drop plate 13 is ready to accept a newly charged workpiece while at the same time placing opening 19 over the mold station ready to pass on or guide discharged formed articles. Opening 18 is further adapted with inlet guide or chute means shown as funnel 20 above said opening which helps in directing and retaining workpieces in the proper feed position. Similarly opening 19 is adapted with outlet guide or chute means 21 above said opening for directing the flow of ejected or discharged articles from the blow mold station. Such guide means may be permanently affixed or adapted to be readily removable from said base means.

The means for reciprocally moving the feeding and discharge apparatus is shown as a pneumatic cylinder 16 such as a double acting air cylinder, and piston rod 17 which is affixed to and reciprocally moves the base means including the frame and guide means. This actuating device is a conventional means known in the art and a variety of mechanical, hydraulic or pneumatic devices may be used to actuate movement of the base means.

In another feature of this invention conveyor means are provided to work in combination with the feed and discharge apparatus already described. As illustrated in FIGS. 1 and 2 the conveyor means is shown supported by the frame means 11 and has a conveyor belt 24, drive pulley 22, tension pulley 23 and drive shaft 29. All the details of this equipment including the motor, the connection of the drive shaft and actuation means are not shown since these as well as other features of conveyors per se are conventional. The conveyor means and particularly the belt is positioned so that when the base means is moved from the original workpiece load position to a position for feeding the blow mold station, the conveyor belt will then be in said workpiece load position replacing feed opening 18. This will allow for the removal of additional workpieces supplied from apparatus not shown if the feeding and discharge apparatus does not return to its original position due to a malfunction of the blow mold or otherwise. To aid as a guide in removing workpieces along the conveyor belt 24, retaining plates 25 and 26 are provided along the length of the belt. Plate 26 is shown as a hinge plate, hinged to the frame at 28. The hinge plate as shown is adapted to pivot outwardly by a force exerted by means or structures (not shown) connected thereto at 27. This plate may be positioned in a set or fixed position as the other retaining plate 25 is.

In operation, a workpiece such as a previously formed thermoplastic preform which has been reheated to orientation temperature and having a tubular body with one open end and one closed end is disposed within the feed opening 18 on the main body 12 of the base means. The preform is positioned so as to have the open end down and the closed end up and is retained within opening 18 by drop plate 13. Actuating device 16 triggered by means such as a timer or mechanical mechanism and synchronized with the operation of the blow mold, then slidably moves the base means in combination with frame means 11 and guide means 14 and 15. After the base means including the main body, the stop means and the frame moves a fixed distance, bar member 32 of the frame abuts with stop plate members 30 and 31 thereby causing the frame and the stop means to stop in that position. However due to the continued pull of the actuating device 16 in combination with the movement of the guide means and the associated compression springs 33 and 34, the main body of the base means continues to move to the right thereby separating the stop means (drop plate 13) from its position below opening 18. This allows the preform to drop into the center of the open blow mold station located below, see FIG. 3. Stretch rod 43 will receive the open end of the preform and thereafter the mold will close and begin its stretching and blowing function. At the same time, the feeding and discharge apparatus will move back to its original position whereby receiving means i.e. feed opening 18 and stop means 13 are ready to accept and retain another preform. Discharge opening 19 is at that time in a position to accept and pass on ejected articles after they are formed, the mold opened and the articles released from the mold by the blowing of air or other ejection means. The discharge opening 19 and associated guide or chute means 21 are provided to pass the ejected articles either directly to further work stations such as a packaging or fill station or be connected to additional guide lines and/or conveyor means which will carry the articles to a desired work station.

The conveyor means associated with this apparatus is adapted to function when the apparatus is in a position as shown in FIG. 3 and is not ready to accept new workpieces. Any shutdown of equipment upstream, even for a short time, would be highly undesirable particularly when the reheating method is being used, therefore the conveyor is provided to merely displace dropped workpieces from the area.

The apparatus of this invention may be utilized to accommodate one or more blow mold stations as shown in FIG. 1 wherein five feeding and discharge units are shown. Means for opening and closing the mold station have not been shown since this can be any of the known mechanical, hydraulic or pneumatic means.

The resilient means utilized in the apparatus of this invention may be any springlike means which can be used in association with the actuation device to continue movement of the main body of the base means for a further short distance after the stop means has ceased movement. Such means would include compression springs which are preferred and a hydraulic damper or dash pot.

The guide means illustrated herein are two rods, however one or more of said guides may be used and they may be in a variety of other known shapes or configurations such as a square guide.

As illustrated, the main body is adapted with guide or chute means 20 for directing and retaining the workpiece in position. It is to be noted that the main body may be formed of sufficient thickness or depth so as not to require any such guide means. Likewise the main body may have the desired depth and shape at opening 19 so as to eliminate the need for guide means 21.

The apparatus of this invention is particularly adapted to convey workpieces to one or more mold stations and pass on or guide discharged articles from said mold at a rapid rate and in a continuous manner. To accomplish this more readily the actuation device may be adapted to operate in combination with the activity of the mold station through conventional means such as timers, limit switches, cams and other electrical, mechanical and instrumentation means.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. Apparatus for feeding workpieces to and discharging articles from a blow mold comprising:
   a. base means above a blow mold having at least one pair of adjacent feed and discharge openings and including stop means associated with said feed opening for temporarily obstructing passage of a workpiece through said feed opening;
   b. means connected to said base means for reciprocating said base means laterally with respect to said mold to position the center of said feed opening over the center of said mold when feeding a workpiece and in position to receive a new workpiece when the center of said discharge opening is positioned over the center of said mold for receiving a discharged article;
   c. means in the path of said base means for delimiting reciprocating movement of said stop means; and
   d. resilient means associated with said base means to allow sufficient continued movement of the portion of said base means containing said opening after said stop means has stopped to remove the obstruction at said feed opening provided by said stop means and thereby allow said workpiece to continue through said feed opening.

2. The apparatus of claim 1 wherein said resilient means comprise compression springs.

3. The apparatus of claim 1 wherein said feed and discharge openings are adapted with upright guide means above said openings.

4. The apparatus of claim 1 including conveyor means associated with said base means and adapted to reciprocally move in combination therewith and positioned so as to replace the feed opening when it is moved away from the workpiece loading area.

5. The apparatus of claim 4 wherein retaining plate means are provided along the sides of the conveyor means.

6. The apparatus of claim 1 wherein said base means includes frame and guide support means.

7. The apparatus of claim 6 wherein said resilient means comprise compression springs.

8. The apparatus of claim 7 wherein said feed and discharge openings are adapted with upright guide means above said openings.

9. The apparatus of claim 8 including conveyor means associated with said base means and adapted to reciprocally move in combination therewith and positioned so as to replace the feed opening when it is moved away from the workpiece loading area.

10. The apparatus of claim 9 wherein retaining plate means are provided along the sides of the conveyor means.

11. The apparatus of claim 1 wherein said blow mold includes stretch rod means centered therein.

12. The apparatus of claim 1 wherein said stop means comprises a solid plate.

13. The apparatus of claim 6 wherein said stop means is affixed to said frame means and said resilient means is associated with said guide support means and the portion of said base means containing said openings allowing continued movement of said portion along said guide suppor means after said stop means has stopped.

14. The apparatus of claim 13 wherein said blow mold includes stretch rod means centered therein.

* * * * *

UNITED STATES PATENT AND TRADEMARK OFFICE
CERTIFICATE OF CORRECTION

PATENT NO. : 3,982,635
DATED : September 28, 1976
INVENTOR(S) : Charles L. D. Chin, William R. Wiggins, Jon D. Yonko It is certified that error appears in the above-identified patent and that said Letters Patent are hereby corrected as shown below:

Col. 1, line 9, after "over" delete "200" and insert --- 100 ---.

Col. 2, line 37, before "articles" delete "blow" and insert --- blown ---.

Col. 6, Claim 1, line 8, after "said" second instance, delete "opening" and insert --- openings ---.

Signed and Sealed this

Eighteenth Day of January 1977

[SEAL]

Attest:

RUTH C. MASON
Attesting Officer

C. MARSHALL DANN
Commissioner of Patents and Trademarks